United States Patent
Shin et al.

(10) Patent No.: US 12,233,479 B2
(45) Date of Patent: Feb. 25, 2025

(54) METHODS OF ENHANCING SURFACE HARDNESS OF QUENCH-SENSITIVE AGE-HARDENING MATERIALS, ALLOYS PRODUCED THEREFROM, AND LASER CLADDING SYSTEMS THEREFOR

(71) Applicant: Purdue Research Foundation, West Lafayette, IN (US)

(72) Inventors: Yung Shin, West Lafayette, IN (US); Corbin Grohol, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 124 days.

(21) Appl. No.: 17/893,049

(22) Filed: Aug. 22, 2022

(65) Prior Publication Data
US 2023/0356329 A1   Nov. 9, 2023

Related U.S. Application Data

(60) Provisional application No. 63/237,118, filed on Aug. 25, 2021.

(51) Int. Cl.
*B23K 26/342* (2014.01)
*B23K 26/14* (2014.01)
(Continued)

(52) U.S. Cl.
CPC ........ *B23K 26/342* (2015.10); *B23K 26/1464* (2013.01); *C22F 1/002* (2013.01); *C22F 1/04* (2013.01)

(58) Field of Classification Search
CPC .......... B22F 10/20; B22F 10/25; B22F 10/28; B33Y 10/00; B23K 26/342;
(Continued)

(56) References Cited

U.S. PATENT DOCUMENTS

2017/0314109 A1* 11/2017 McCloskey ............ B22F 10/64
2018/0147628 A1*  5/2018 Saxena ................ B23K 26/034
(Continued)

FOREIGN PATENT DOCUMENTS

EP          2511037 B1    12/2016

OTHER PUBLICATIONS

Q. Liu, M. Janardhana, B. Hinton, M. Brandt, K. Sharp, Laser cladding as a potential repair technology for damaged aircraft components, Int. J. Struct. Integr. 2 (2011) 314-331. https://doi.org/10.1108/17579861111162914.
(Continued)

*Primary Examiner* — Michael P Wieczorek
(74) *Attorney, Agent, or Firm* — Hartman Global IP Law; Gary M. Hartman; Domenica N.S. Hartman

(57) ABSTRACT

Methods of enhancing surface hardness of a quench-sensitive age-hardening material, such as an aluminum alloy, with cryogenic quenching, aluminum alloys produced by the methods, and a laser cladding system with cryogenic quenching capability. Laser cladding or other heat treatment of a quench-sensitive age-hardening material, such as an aluminum alloy, is combined with in-situ cryogenic quenching of the heated area with a spray of cryogenic fluid as the material cools down from the cladding or other heat treatment. The laser cladding system has both a laser emitter to heat a workpiece and a cryogenic nozzle to deliver a cryogenic fluid spray onto the workpiece. The resulting material may have a surface hardness higher than can be achieved without the quenching spray, often approaching or exceeding a T6 temper, without using a solution heat treatment.

8 Claims, 9 Drawing Sheets

(51) Int. Cl.
*C22F 1/00* (2006.01)
*C22F 1/04* (2006.01)

(58) Field of Classification Search
CPC .. B23K 26/1464; B23K 26/703; B23K 26/21; B23K 26/34; B23K 26/60; C22F 1/002; C22F 1/04
See application file for complete search history.

(56) References Cited

U.S. PATENT DOCUMENTS

2021/0370587 A1* 12/2021 Camilleri .............. C23C 24/082
2022/0143900 A1* 5/2022 Nasserrafi ............. B29C 64/209

OTHER PUBLICATIONS

K.C. Meinert, P. Bergan, Refurbishment of heat treatable aluminum alloys by laser cladding, in: Int. Congr. Appl. Lasers Electro-Optics, Laser Institute of America, 1998: pp. D58-D65. https://doi.org/10.2351/1.5059131.

K.C. Meinert, P. Bergan, Refurbishment of aluminum alloys by laser cladding, in: Int. Congr. Appl. Lasers Electro-Optics, Laser Institute of America, 1999: pp. F49-F57. https://doi.org/10.2351/1.5059284.

Q. Liu, P.K. Sharp, M. Brandt, Y. Durandet, Effects of process parameters on the quality of laser cladding of 7075-T6 aluminium alloy with Al—Si powder, in: Pacific Int. Conf. Appl. Lasers Opt., Laser Institute of America, 2004: p. 306. https://doi.org/10.2351/1.5056094.

Y. Durandet, M. Brandt, Q. Liu, Challenges of laser cladding Al 7075 alloy with Al—12Si alloy powder, Mater. Forum. 29 (2005) 136-142.

R. Cottam, Q. Liu, Y.C. Wong, J. Wang, M. Brandt, Laser cladding of high strength aluminium alloy 7075 powder on a 7075 substrate for repair of damged components, Mater. Forum. 35 (2011) 89-94. http://hdl.handle.net/1959.3/218130.

R. Cottam, V. Luzin, Q. Liu, Y.C. Wong, J. Wang, M. Brandt, Investigation into Heat Treatment and Residual Stress in Laser Clad AA7075 Powder on AA7075 Substrate, Metallogr. Microstruct. Anal. 2 (2013) 205-212. https://doi.org/10.1007/s13632-013-0080-x.

C.M. Grohol, Y.C. Shin, A. Frank, Laser cladding of aluminum alloy 6061 via off-axis powder injection, Surf. Coatings Technol. 415 (2021) 127099. https://doi.org/10.1016/j.surfcoat.2021.127099.

Z. Cui, H. Shi, W. Wang, B. Xu, Laser surface melting AZ31B magnesium alloy with liquid nitrogen-assisted cooling, Trans. Nonferrous Met. Soc. China. 25 (2015) 1446-1453. https://doi.org/10.1016/S1003-6326(15)63744-X.

A. Lisiecki, D. Ślizak, A. Kukofka, Laser cladding of Co-based metallic powder at cryogenic conditions, J. Achiev. Mater. Manuf. Eng. 1 (2019) 20-31. https://doi.org/10.5604/01.3001.0013.7622.

A. Lisiecki, D. Ślizak, Hybrid Laser Deposition of Fe-Based Metallic Powder under Cryogenic Conditions, Metals (Basel). 10 (2020) 190. https://doi.org/10.3390/met10020190.

* cited by examiner

METHODS OF ENHANCING SURFACE HARDNESS OF QUENCH-SENSITIVE AGE-HARDENING MATERIALS, ALLOYS PRODUCED THEREFROM, AND LASER CLADDING SYSTEMS THEREFOR

CROSS-REFERENCE TO RELATED APPLICATIONS

This application claims the benefit of Provisional U.S. Patent Application No. 63/237,118, filed Aug. 25, 2021, the contents of which are incorporated by reference herein in their entirety.

STATEMENT REGARDING GOVERNMENT FUNDING

This invention was made with government support under Contract Number N00174-17-1-0001 awarded by Naval Underwater Warfare Center. The government has certain rights in the invention.

BACKGROUND OF THE INVENTION

The present invention relates generally to methods of enhancing surface hardness of quench-sensitive age-hardening materials, alloys produced by such methods, and a laser cladding system with cryogenic quenching capability. In some embodiments, this disclosure relates to methods of improving the cooling rate of surface hardening treatments, especially laser cladding of aluminum alloys, and related apparatus and resulting materials.

Laser cladding is a manufacturing process in which a high-powered laser beam is used to deposit thin coatings onto a workpiece surface. The laser is scanned across the workpiece and locally melts material feedstock delivered by wire or powder to create the clad layer. The goal of the process is to produce coatings of high quality (no cracking, porosity, delamination, etc.) that possess the desired surface properties (hardness, wear resistance, corrosion resistance, thermal performance, etc.). Laser cladding can be utilized in the repair and refurbishment of heat treatable aluminum alloys. Age-related problems often arise with aluminum components in the aerospace and defense industries because of fatigue, corrosion, and wear. Since these damage processes occur at the surface, laser cladding is a useful remanufacturing technology. Repairing rather than replacing parts can lower cost, downtime, and environmental effects.

An important strengthening mechanism in heat treatable aluminum alloys is age hardening (also known as precipitation hardening). FIG. 1 summarizes the conventional heat treatment sequence for age-hardening aluminum alloys. This sequence results in the T6 temper, which is the maximum strength available from the precipitation hardening mechanism. The following briefly describes the material kinetics that occur in the conventional heat treatment sequence of FIG. 1. In step (1) of FIG. 1, solution heat treatment is performed by soaking the workpiece in a furnace at a suitably high temperature (for example, about 465° C. to about 565° C.). The alloying elements are dissolved into the aluminum matrix and form a solid solution. In step (2) of FIG. 1, the workpiece is quenched to ambient temperature by spraying or submerging the workpiece in a quenching fluid. Age-hardening aluminum alloys are quench sensitive and lose the ability to achieve the full T6 temper strength as the cooling rate during this step decreases. Slow cooling allows the alloying elements to precipitate out of the aluminum matrix and form large (tens of microns in size) precipitates that contribute little to the strength of the material. It is therefore desirable for the cooling rate to be high enough to suppress all precipitation so that step (2) results in a super-saturated solid solution (SSSS). In step (3) of FIG. 1, the workpiece is artificially aged by soaking the workpiece in a furnace at an intermediate temperature (for example, about 120° C. to about 205° C.). During this time, the SSSS undergoes a precipitation sequence that results in the formation of nano-scale precipitates in the aluminum matrix. The material is then in the T6 temper which is the highest hardness available from the precipitation strengthening mechanism.

FIG. 2 depicts the conventional temperature versus time heat treatment sequence for producing the peak hardness T6 temper in age-hardening aluminum alloys. This heat treatment cycle of age-hardening aluminum alloys exploits the temperature-dependent solubility of the alloying elements in the aluminum matrix. For example, in Al—Mg—Si alloys (6000 series), the solubility of $Mg_2Si$ ranges from 0.1 wt. % at room temperature to 1.85 wt. % at the 595° C. eutectic temperature. That is, the aluminum matrix is capable of holding more solute of the alloying elements at higher temperatures.

Age-hardening aluminum alloys are commonly used in many industries, including aerospace and defense. The vehicles are often operated beyond their original design life and replacement parts can be cost-prohibitive or unavailable (for example, if the original supplier no longer exists). Laser cladding is a viable technology for the surface repair of the damaged aluminum components. However, in the case of age-hardening aluminum alloys, the as-deposited clad may not exhibit the strength and hardness of the original material in the T6 temper. Implementing the conventional age-hardening heat treatment sequence will bring the deposited clad material to the strength of the T6 temper, provided that the laser cladding process did not cause the vaporization of alloying elements. From a technical perspective, this strategy is effective. Solution heat treatment, however, requires a high temperature furnace capable of about 530° C. for aluminum alloy (AA) 6061 and about 470° C. for AA7075. A furnace of this temperature capability and size may not be cost-effective or available considering the components are likely repaired by the end user and not the original equipment manufacturer.

In view of the foregoing, there is an unmet need for a heat treatment method for laser clad age-hardening aluminum alloys that achieves the properties of the T6 temper, while avoiding the solution heat treatment and high temperature furnace of the conventional heat treatment sequence described above.

BRIEF SUMMARY OF THE INVENTION

According to a nonlimiting aspect of the invention, a method of enhancing surface hardness of a component made of an aluminum alloy is provided. The method includes depositing an aluminum clad on a component made of an aluminum alloy, and quenching the deposited aluminum clad using an in-situ cryogenic spray as the aluminum clad cools from the depositing step. In some arrangements, the method may result in a component made of the aluminum having hardness value larger than achievable without the quenching with the in-situ cryogenic spray.

According to another nonlimiting aspect of the invention, a method of enhancing surface hardness of a quench-sensitive age-hardening material is provided. The method includes providing a workpiece made of quench-sensitive age hardening material, and providing a heat source for heating the workpiece and a cryogenic nozzle for delivery of a cryogenic quenching fluid. A surface of the workpiece is scanned with the at least one heat source. The surface of the workpiece is quenched with a spray of the cryogenic quenching fluid from the cryogenic nozzle. The spray of the cryogenic quenching fluid immediately follows the heat source and quenches the workpiece. In some arrangements, the method may result in a surface hardness higher than can be achieved without the quenching spray.

According to yet another nonlimiting aspect of the invention, a component of an aluminum alloy with an aluminum clad is provided that is formed using the disclosed methods.

According to a still further nonlimiting aspect of the invention, a laser cladding system is provided. The laser cladding system includes a laser emitter configured to heat at least one of a deposition material and a portion of a workpiece at a heating site on a surface of the workpiece onto which the deposition material is deposited. A cryogenic nozzle is configured to deliver a cryogenic fluid spray onto the workpiece adjacent to the heating site and downstream from the heating site in a direction of relative motion between the laser emitter and the workpiece.

In some arrangements, the methods and apparatus of the present disclosure may provide for production of aluminum alloy clads having T6 temper without the requirement of solution heat treatment.

These and other aspects, arrangements, features, and/or technical effects will become apparent upon detailed inspection of the figures and the following description.

BRIEF DESCRIPTION OF DRAWINGS

Some of the figures shown herein may have been created from scaled drawings or from photographs that are scalable. It is understood that such dimensions, or the relative scaling within a figure are by way of example, and not to be construed as limiting.

DETAILED DESCRIPTION OF THE INVENTION

Figure 1:
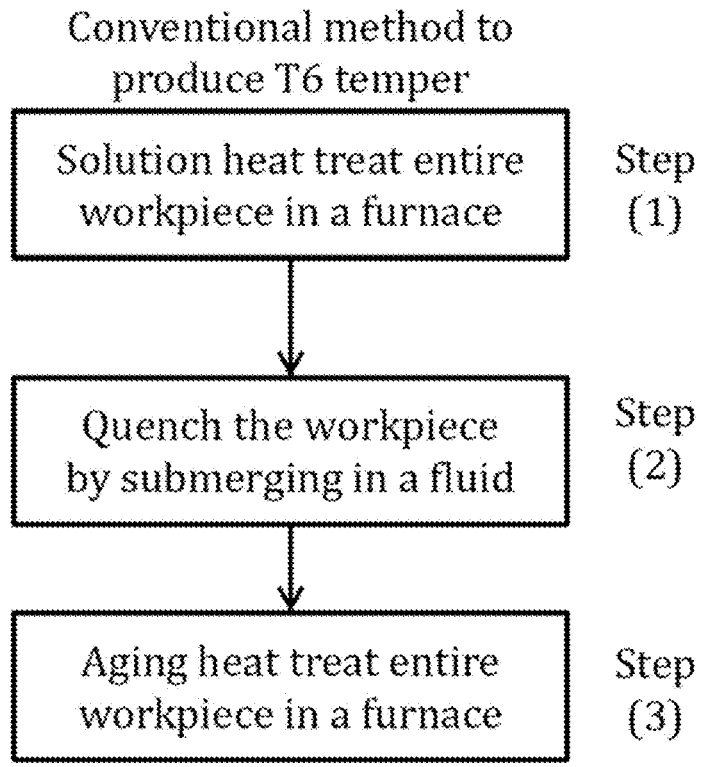
FIG. 1 is a process flow chart in a conventional heat treatment sequence for producing the T6 temper in age-hardening aluminum alloys.
Figure 2:
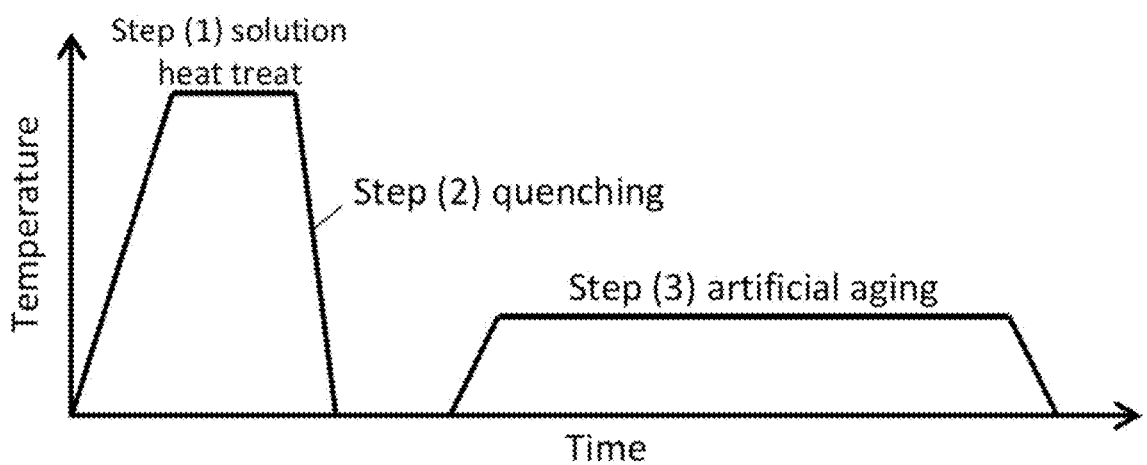
FIG. 2 is a graph of temperature versus time in the conventional age-hardening heat treatment sequence of FIG. 1 to produce the T6 temper in age-hardening aluminum alloys.

The intended purpose of the following detailed description of the invention and the phraseology and terminology employed therein is to describe what is shown in the drawings, which relate to one or more nonlimiting embodiments of the invention, and to describe certain but not all aspects of what is depicted in the drawings, including the embodiment(s) to which the drawings relate. The following detailed description also describes certain investigations relating to the embodiment(s) depicted in the drawings, and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

It is understood that any reference to "the disclosure" is a reference to an embodiment of a family of disclosures, with no single embodiment including an apparatus, process, or composition that should be included in all embodiments, unless otherwise stated. Further, although there may be discussion with regards to "advantages" provided by some embodiments of the present disclosure, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which may be optional for some embodiments.

Methods and apparatus for the improvement of cooling rate and hardness in the deposition and surface treatment of age-hardening aluminum alloys are provided. According to some aspects, a heat source scans across the surface of a workpiece and is followed by a cryogenic fluid spray. The spray increases the cooling rate of the quench-sensitive material, thereby increasing the hardness response to aging heat treatment. The method of cryogenic quenching, when followed by aging heat treatment, produces material hardness similar to the peak-strength T6 temper. The present method may be implemented to produce high-hardness surface properties without the requirement for treating the workpiece in a high-temperature furnace as in the conventional three-step age-hardening heat treatment sequence described previously. The method of the present disclosure may be implemented with material deposition to build up the surface of the workpiece or without material deposition to improve the hardness of the existing surface.

In one nonlimiting example, a method to deposit quench-sensitive age-hardening aluminum alloy dads according to the present disclosure is implemented to produce a hardness similar to the T6 temper without the requirement of solution heat treatment. A high-powered cladding laser is scanned across the workpiece surface and material feedstock is delivered and melted via off-axis powder injection. The cladding process is immediately followed by quenching with liquid nitrogen, which improves the cooling rate of the quench-sensitive material and increases the hardness response to subsequent precipitation heat treatment. The method was demonstrated on the laser cladding of aluminum alloy 6061 where including the liquid nitrogen quenching improved the single-layer single-track clad hardness by 15.7%. Multi-track multi-layer cladding further improved the hardness to be the level comparable to the T6 temper. Transmission electron microscopy revealed the increased precipitate density, causing the higher hardness that resulted from the liquid nitrogen quenching.

Laser cladding typically involves the melting of a feedstock material and a small region of the workpiece to deposit clad on the surface of the workpiece in that small region. The deposited clad formed therefrom is therefore above the solution heat treatment temperature during deposition. In some arrangements, the methods and apparatus of the present disclosure may leverage this feature as a quasi-solution heat treatment to replace step (1) of the conventional age-hardening heat treatment sequence described previously. As the clad cools after deposition, the natural cooling rate may be insufficient to create the T6 temper due to the quench sensitivity of age-hardening aluminum alloys. In some arrangements, the methods and apparatus of the present disclosure may deliver a cryogenic fluid spray as a quenching agent onto a region immediately behind the laser during material deposition, thereby serving as step (2) of the heat treatment sequence. Thus, the methods and apparatus of the present disclosure may eliminate the need for separate solution heat treatment and/or quenching of the entire workpiece as performed in the conventional age-hardening heat treatment sequence described previously. The cryogenic spray also may remove heat from the workpiece, which may improve the properties of the heat-affected zone (HAZ). Step (3), aging at an elevated temperature, remains the same, although in some arrangements may optionally be omitted. The desired result is deposited clad material that possesses similar properties to the peak-strength T6 temper.

Cryogenic quenching of manufacturing processes has been investigated by several researchers. Laser surface melting with the substrate bathed in liquid nitrogen has been reported for Ti6Al4V, Superston alloy for ship propellers, and AZ31B magnesium alloy while focusing on surface nitriding, cavitation resistance, and corrosion resistance, respectively. Cryogenic cooling was also used in friction stir welding of AA2014 for grain size reduction and hardness improvement. A method of cladding with in-situ cryogenic substrate cooling has been reported with the aim to reduce the clad dilution in applications where the materials are dissimilar. Laser cladding of Co-based and Fe-based materials on substrates submerged in liquid nitrogen has also been studied with the benefits of microstructure refinement, surface nitriding, and dilution control. The aforementioned research demonstrates laser cladding under cryogenic conditions has been applied to several material systems. However, to the best knowledge of the inventors, the industrially ubiquitous material category of age-hardening aluminum alloys has yet to be investigated, which is addressed in this disclosure. Additionally, in contrast to the conventional methods described previously, the methods and apparatus of the present disclosure use in-situ cryogenic quenching as an integral step of the heat treatment process to produce dads in the T6 temper without the requirement of solution heat treatment.

Figure 3:
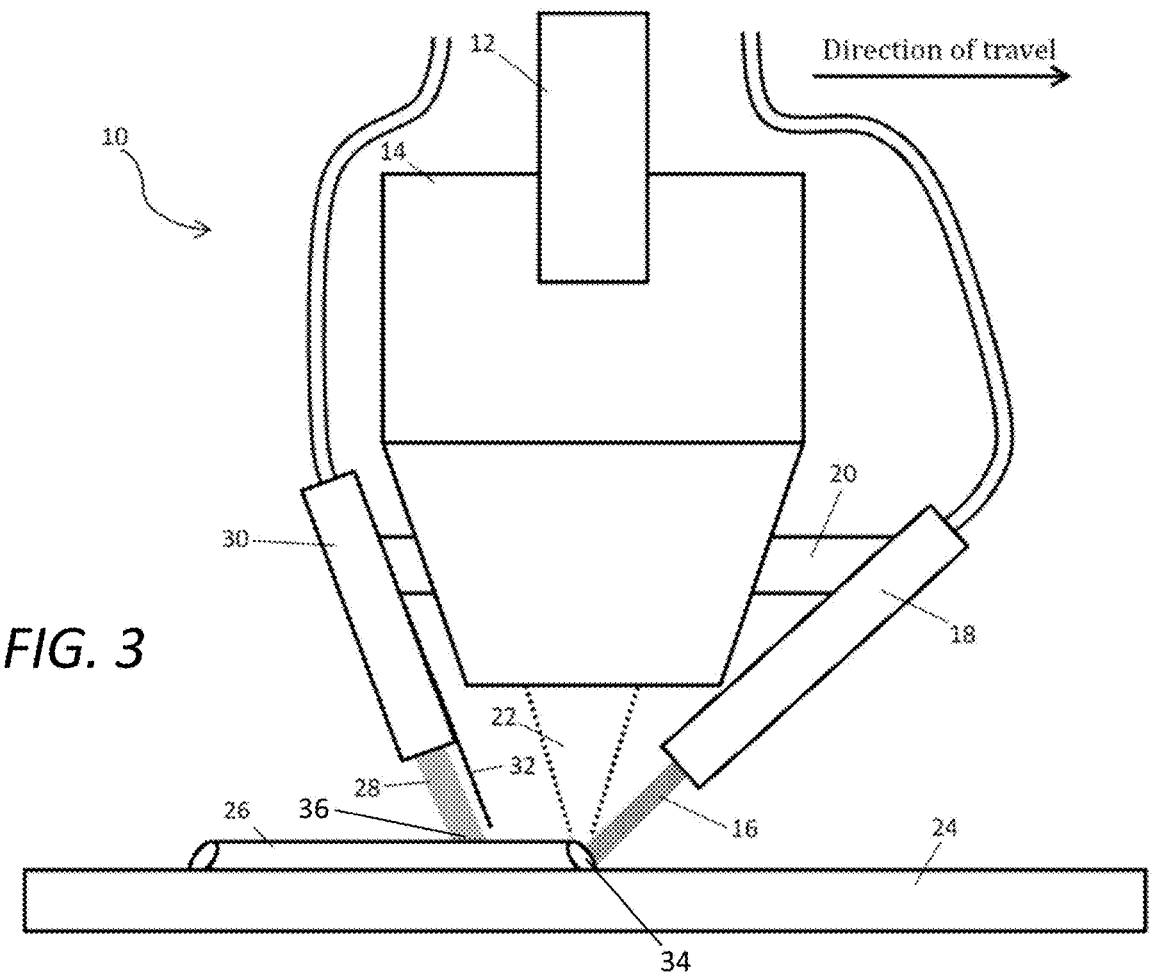
FIG. 3 illustrates a laser cladding system with in-situ cryogenic quenching in the process of cladding a substrate material (scanning direction is left to right) in accordance with aspects of the present invention.

Turning now to the drawings, FIG. 3 shows a nonlimiting example embodiment of a laser cladding system 10 with in-situ cryogenic quenching for implementing the method of applying cryogenic quenching as an integral step in the deposition process of aluminum alloys. The laser cladding system 10 is mounted to a robotic arm, or other system for motion control, through a bracket 12. A high-powered laser emitter 14 is used as the heat source for the process. Powdered material feedstock 16 is delivered through a side-feed (or co-axial) material deposition nozzle 18 which is attached to the system through a bracket 20. Laser irradiation 22 (e.g., a focused laser beam) interacts with the powder flow 16 and workpiece 24 to deposit the clad track 26 at a heating site 34 where the laser melts the powder and the underlying portion of the workpiece. The clad material 26 may be deposited at any thickness capable of being successfully clad to the workpiece 24. A typical example range of the thickness of the clad material 26 is a thickness between approximately 50 micrometers and approximately 5 millimeters. In some examples, the clad material may be applied at a thickness between about 0.5 millimeters to about 2.5 millimeters. In this example, the laser cladding system 10 is traversed from left to right to continuously deposit clad material. However, the relative movement between the laser cladding system 10 and the workpiece 24 may be any direction as long as the relative movement of the workpiece is from heating site 34 toward the quench site 36 so that the quench site 36 is located downstream from the heating site 34. At the same time as the laser is melting the powder flow 16, cryogenic fluid spray 28 is delivered through a cryogenic nozzle 30 to quench the newly deposited clad material 26 at a quench site 36 adjacent to and downstream from (in the direction of travel of the workpiece relative to the laser emitter) the heating site 34. Preferably, the cryogenic nozzle 30 and positioned such that the cryogenic spray engages the clad material while it is still cooling down from the deposition process, for example before it reaches room temperature, and even more preferably, before the aluminum clad reaches its precipitation temperature range while cooling from the deposition. The powder flow 16 is protected from the cryogenic spray 28 via a shield 32. In this way, the laser cladding system 10 both heats and quenches the newly deposited clad material as part of the same deposition process, thereby eliminating the need for a separate, subsequent heating and quenching process.

Figure 4:
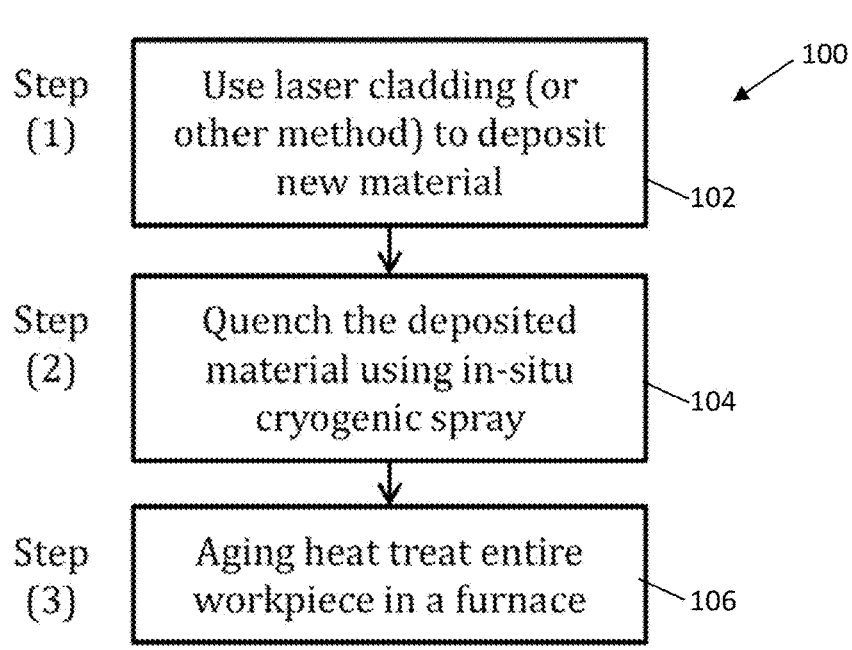
FIG. 4 is a process flow chart of a method to produce tempered clad deposits in accordance with aspects of the present invention.

The method of the present of the present disclosure as implemented on the laser cladding system 10 can be used in lieu of the conventional heat treatment sequence described previously. With reference to FIG. 4, a laser cladding process 100 with cryogenic quenching is implemented by the laser cladding system 10. In step 102, the laser cladding system 10 is used to deposit the clad material 26 onto the surface of the workpiece 24. The heat input from the laser 22 both melts the deposition material 26 and adjacent portions of the workpiece 24 and also serves as a pseudo-solution heat treatment for the clad region and near-surface region of the workpiece. The deposited material 26 then cools through conduction to the rest of the workpiece and convection/radiation to the environment. However, due to the quench sensitivity of age-hardening aluminum alloys, the natural cooling rate can be insufficient to produce the maximum concentration of SSSS. To prevent such slow cooling, that is to increase the cooling rate above the natural cooling rate, in step 104, quenching occurs, such as with liquid nitrogen that is sprayed onto the deposited material directly following the laser to increase the cooling rate of the melted cladding and near-surface region of the workpiece as it cools down from the deposition step. Preferably, the quenching at 104 begins at least before the aluminum clad reaches room temperature as it cools from the deposition, more preferably before the temperature of the aluminum clad falls below its precipitation temperature range, and even more preferably before aluminum clad reaches its precipitation temperature range while cooling from the depositing step. This increases the concentration of SSSS and the ability of the material to respond to aging heat treatment. At step 106, the method optionally proceeds the same as the conventional method with an aging heat treatment, which transforms the SSSS into the fine precipitates and increases the hardness of the material. In this way, the quenching with the in-situ cryogenic spray and the heating with the laser can occur continuously and simultaneously on the same workpiece.

The cryogenic spray 28 applied by the cryogenic nozzle 30 may be any cryogenic fluid, which typically are considered as fluids having a boiling point below about −90° C. Thus, the cryogenic spray 28 would have a temperature typically below about −90° C. as it exits the cryogenic nozzle 30, and preferably also as it impacts the clad material 26 at the quenching site. One example cryogenic spray 28 suitable for the method 100 and system 10 is liquid nitrogen, which has boiling point of approximately −195° C. and is preferably ejected from the cryogenic nozzle 30 while still in liquid form below its boiling point.

Figure 5:
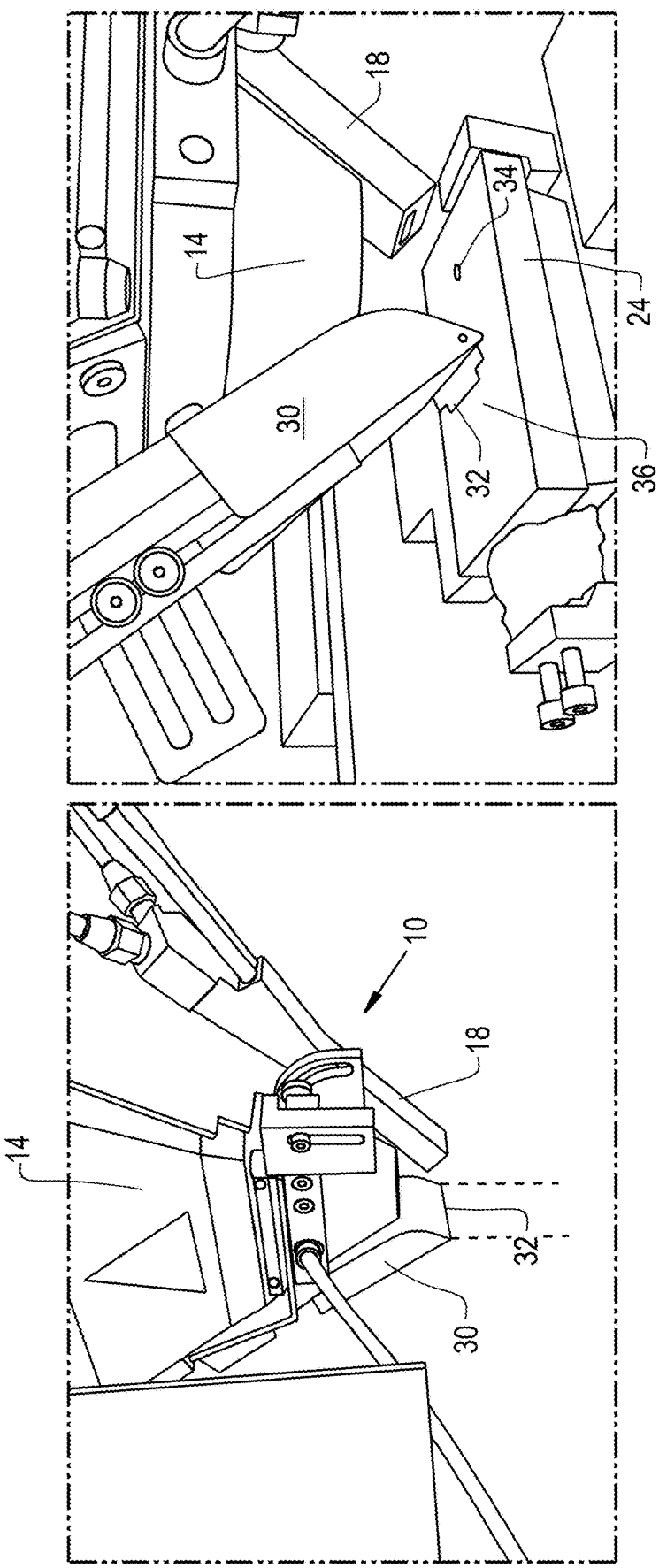
FIG. 5 contains images showing a laser cladding system alone and the laser cladding system interacting with a substrate material (scanning direction is left to right).

FIG. 5 shows an example arrangement of the laser cladding system 10 employed in experiments leading to aspects of this disclosure. In the system 10, a 4.0 kW Nuvonyx ISL-4000L High Power Diode Laser (HPDL) 14 is fixed to a 6-axis Panasonic robot. Optical elements focus an 808 nm wavelength laser beam into a 12 mm by 0.5 mm rectangular profile at the heating site 34 on the workpiece 24. The laser wavelength is well suited for the aluminum spectral absorptivity and the wide and top flat beam profile allows for deposition of wide clad tracks. Powder feedstock is delivered to the laser focus area using a Sulzer Metco 9MP closed-loop powder feed unit and off-axis powder delivery nozzle 18, in this example disposed on the right side of the laser head. A cryogenic nozzle 30, in this example on the left side of the laser head, sprays cryogenic liquid nitrogen onto the deposited clad material at quench location 36 offset a short distance and adjacent the heating site 34. The liquid nitrogen nozzle outlet is 25.4 mm by 0.635 mm which directs the cryogenic quenching agent into a thin sheet. The liquid nitrogen flow is visible in the lefthand image of FIG. 5. The laser cladding system 10 at the laser focus height with guide beam irradiation is shown in the righthand image of FIG. 5. In this example, the laser cladding system 10 is scanned across the surface of the substrate (e.g., workpiece 24) from left to right. Powder feedstock 16 is delivered from the right-side nozzle 18, melted by the laser 22, then quenched by the liquid nitrogen spray from the left-side nozzle 30 in succession as the system 10 moves relative to the workpiece 24. A sheet metal guard 32 is installed on the liquid nitrogen nozzle 30 to help shield the powder flow and the heating site 34 from the cryogenic spray.

Figure 6:
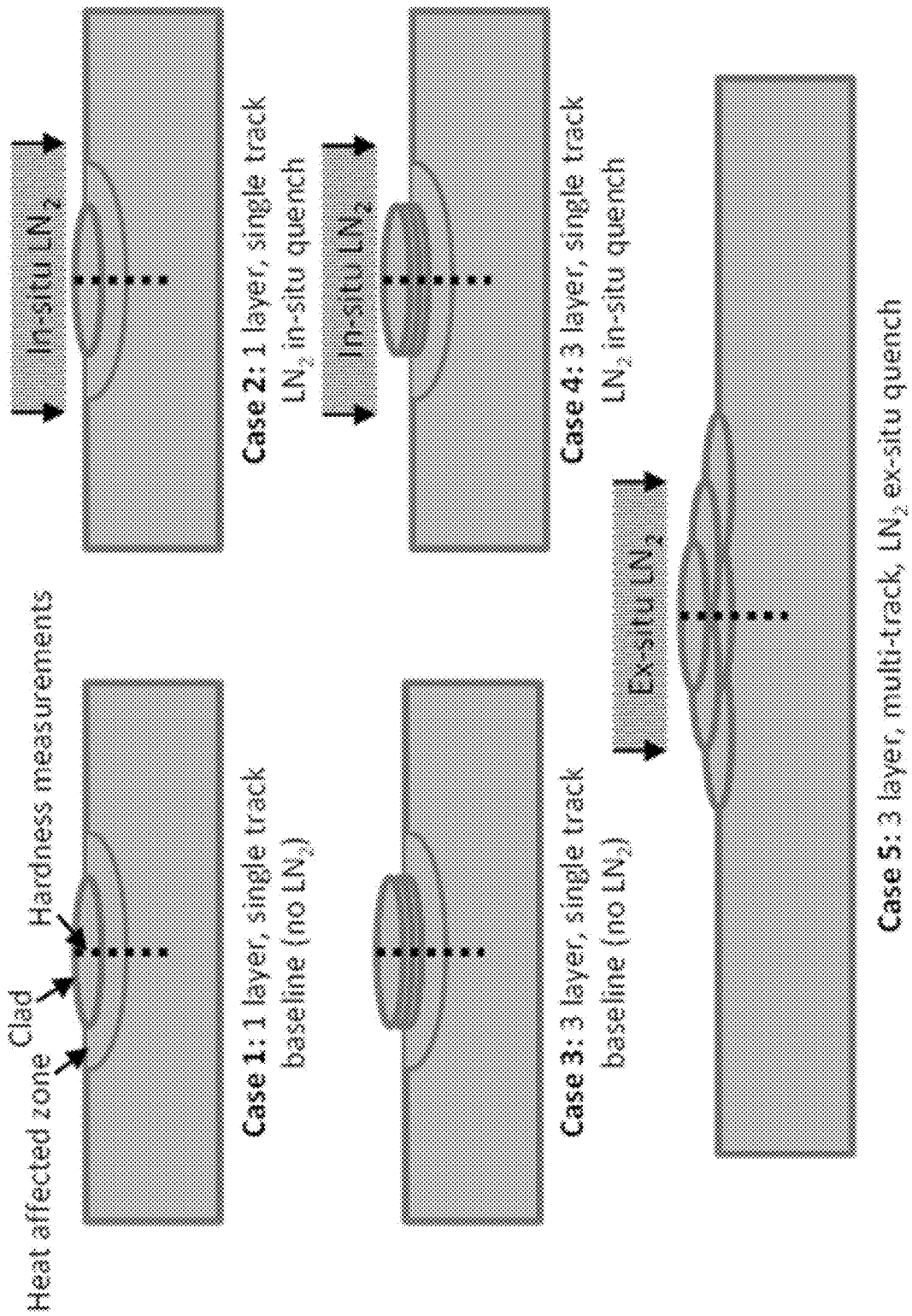
FIG. 6 illustrates cross-sectional views of five cladding cases studied in experiments leading to this disclosure.

Experimental procedure: FIG. 6 shows five cases (referred to herein as Case 1 through Case 5) studied in experiments leading to this disclosure. Referring to FIG. 6, in Case 1, a single-track clad is deposited with no quenching to establish the baseline hardness characteristics. In Case 2, the liquid nitrogen quenching is included in-situ during the clad deposition in accordance with the methods and apparatus disclosed herein. The hardness improvement from the liquid nitrogen can be directly compared to Case 1. Cases 3 and 4 are three-layer single-track dads. In Case 4, the in-situ liquid nitrogen quenching in accordance with the methods and apparatus disclosed herein is used on all three layers of the clad. In Case 5, six dads are deposited in a 3-2-1 pyramid with 20% overlap to produce a multi-track three-layer clad coating. The liquid nitrogen quenching is applied ex-situ. That is, all the clad tracks are deposited first with no quenching agent. A final liquid nitrogen quenching pass of the laser apparatus with laser irradiation but no mass addition is then completed. This method eliminates any disturbance of the powder flow from the liquid nitrogen spray.

The cladding experiments were completed on AA6061-T6511 extruded bar substrates of size 50.8 mm wide×12.7 mm thick×101.6 mm long (Cases 1 to 4) and 101.6 mm wide (Case 5). The surface was wire brushed and wiped with acetone to remove oxidization and provide a repeatable surface condition for the laser. In between each clad track deposition in Cases 3 to 5, the workpiece was allowed to cool, and the surface was prepared again. The wire-brushed surface roughness parameters, measured using a Bruker Contour GT 3D optical profiler, were Sa=0.96 µm±0.24 µm and Sq=1.34 µm±0.40 µm. The AA6061 powder was sieved to −140/+325 (45 µm to 105 µm) and sourced from Valimet. The laser power was set to 3746 W, the scan speed to 5 mm/s, and the powder feed rate to 18 g/min for Cases 1 to 4. To ensure good bonding on the larger substrate in Case 5, the scan speed and powder feed rate were decreased to 4.5 mm/s and 16 g/min, respectively. Helium shielding gas was delivered coaxially with the laser at a flow rate of 48 SCFH (22.6 L/min) and as the powder carrier gas at 20 SCFH (9.4 L/min). Helium was chosen over argon due to the decreased porosity reported in literature for the laser processing of aluminum. The liquid nitrogen flow rate was estimated as 1 L/min and impinged on the substrate surface approximately 30 mm behind the laser focus.

Clad tracks of 76.2 mm in length were deposited, which started 12.7 mm from the beginning of the substrate. A 10 second dwell of the laser with 15 mm defocus (to avoid material buildup) was utilized at the beginning of the clad tracks to lessen the transient time and achieve quasi-steady conditions quickly. The clad coatings were cross sectioned at two thirds of the track length for analysis. Two samples were prepared from each case. One was analyzed in the as-deposited condition while the other was subjected to precipitation heat treatment at 175° C. for 8 hours. The samples were mounted in Bakelite and polished up to colloidal silica. Micro-hardness testing was completed along the vertical centerline of the dads (see FIG. 3) using a PhaseII+Micro Vickers Hardness Tester model 900-390 with a 200 g load and a 10 second dwell time. The indentations were spaced 0.25 mm apart for the first 4 mm from the top surface and then 1 mm spacing until the final depth of 8 mm. Three hardness traces were measured on each sample 0.25 mm apart so the hardness standard deviation could be calculated at each depth. Samples were etched with Keller's reagent for 20 seconds to reveal the fusion zone boundary and then imaged with a Nikon Eclipse LV150 optical microscope.

The precipitate structures in the deposited material from Cases 1, 2, and 5 were examined using Transmission electron microscopy (TEM). One lamella was extracted from each sample using focused ion beam (FIB) milling on a Thermo Scientific™ Helios™ G4 UX DualBeam™ machine. Lamellas about 9 µm×3 µm were thinned to a typical thickness of ~200 nm with the last milling procedure utilizing an ion beam energy of 2 keV, beam current of 150 pA, and ±4° from a parallel incidence. The gallium ion beam in FIB milling induces surface damage and gallium implantation which were reduced using a Fischione Instruments Model 1040 NanoMill®. The milling rate was estimated at between 1 nm/min and 1.5 nm/min using beam energy of 1 keV, electron beam current of 150 µA (induces an argon ion beam current of ~60 pA), milling angle of ±12°, and scan box size of 16 µm×9 µm. Treatment on the NanoMill® for 60 minutes usually thinned the lamellas to between 100 nm and 150 nm. The TEM analysis proceeded on an FEI Tecnai™ G2 20 TEM at 200 kV accelerating voltage.

Al—Mg—Si-alloy precipitation: The AA6061 alloy used as the substrate and powder material in this research is from the 6000 series aluminum material system which contains magnesium and silicon as the most important alloying elements. It is useful to overview the precipitation kinetics of this material to better interpret the results. The quench sensitivity of Al—Mg—Si alloys was investigated by Milkereit et al. They varied the cooling rate during step (2) of the conventional heat treatment sequence over five orders of magnitude and reported the change in precipitation and hardness characteristics. They defined two cooling rate thresholds termed the lower critical cooling rate (LCCR) and upper critical cooling rate (UCCR). Cooling below the LCCR during step (2) results in practically complete precipitation of the alloying elements out of the aluminum matrix. No SSSS is formed and therefore the material does not respond to the subsequent precipitation heat treatment. This results in low material hardness. Cooling above the UCCR during step (2) suppresses almost all precipitation and results in the maximum concentration of SSSS. After precipitation heat treatment, the maximum hardness from the precipitation mechanism is achieved. AA6061 contains silicon in the range of 0.4 wt. % to 0.8 wt. % and magnesium from 0.8 wt. % to 1.2 wt. %. The UCCR is estimated between 500 K/min and 5000 K/min based on the permissible range of alloying elements. The cooling rate is most important through the precipitation temperature range of approximately 500° C. to 250° C.

During step (3), precipitation heat treatment, Al—Mg—Si alloys undergo a precipitation sequence that can be defined as SSSS→Mg,Si solute clusters→Guinier-Preston (GP) zones→β"→β'/U1/U2/B'→β (stable $Mg_2Si$). The precipitate associated with the peak-strength condition is β" having the shape of fine needles approximately 4×4×50 $nm^3$ in size. Excessive heat treatment overages the material by progressing the sequence to the β' precipitate. These have the shape of larger rods approximately 20×20×500 $nm^3$ in size and result in some hardness degradation. Further overaging finalizes the precipitation to the stable β-$Mg_2Si$ (platelets on the micron scale) which contributes little to the strength of the material.

Figure 7:
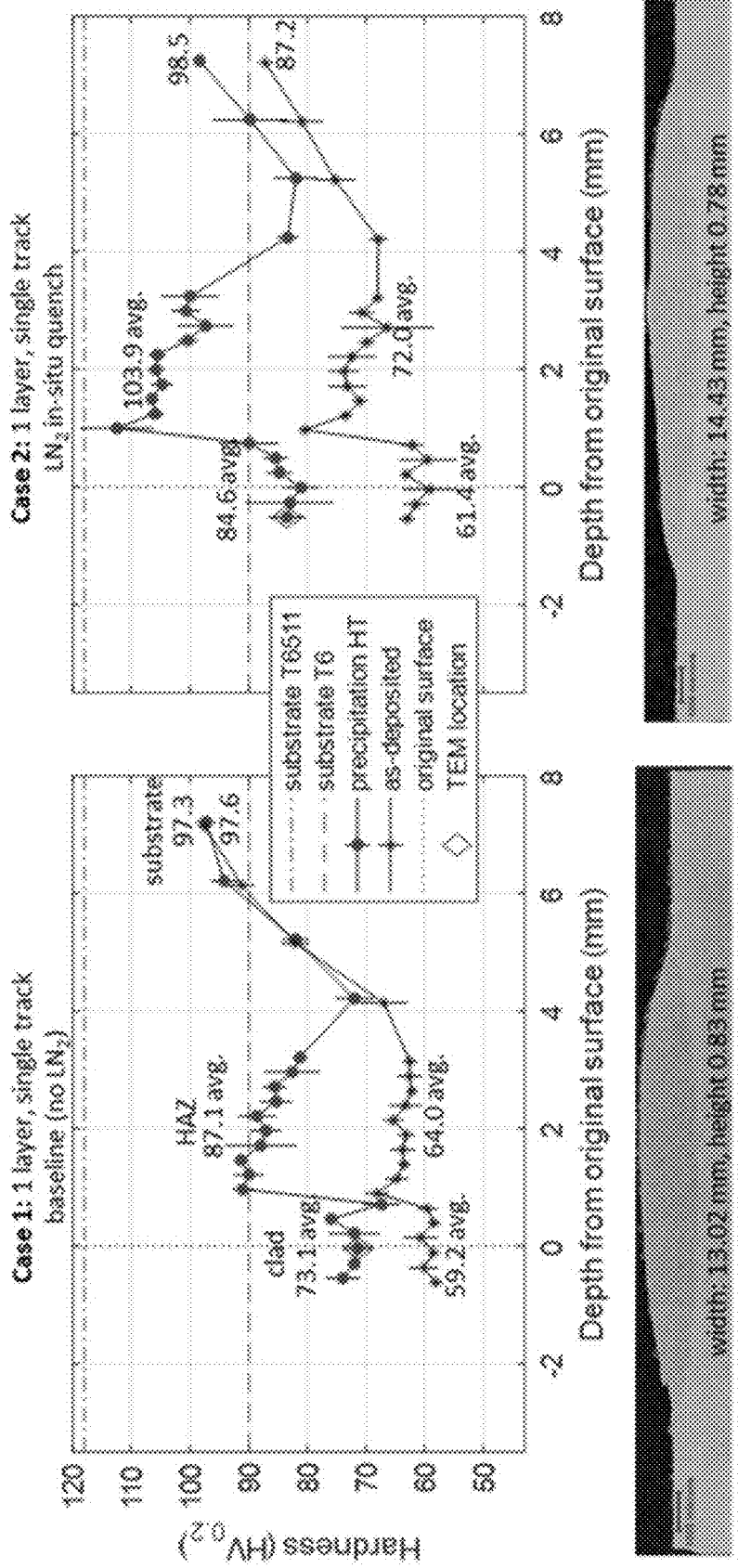
FIG. 7 shows results from single-track single-layer clads showing the hardness along the vertical centerline and clad images for Case 1 and Case 2 of FIG. 6. Image scale bars are 1 mm.

Experimental results: FIG. 7 shows the hardness characteristics in the as-deposited condition and after precipitation heat treatment for Cases 1 and 2 of FIG. 6. Deposited clad material that is above the original surface is indicated by a negative depth. The error bars indicate ±1 standard deviation of the three measurements from each depth. The average hardness values for the clad and HAZ regions are shown in the figure. The as-received substrate material in the T6511 temper had a hardness of 118 HV. The as-received condition includes strengthening form from the precipitates and additional strain hardening from the stress-relief stretching. The substrate, when subjected to the T6 heat treatment, had a hardness of 90 HV as the strain-hardening effect is removed. These substrate hardness values are plotted along with the hardness data as a reference.

Three distinct hardness regions are apparent in Cases 1 and 2. The clad region includes the deposited clad material and the near-surface region of the substrate that experienced melting during the laser cladding process. In Case 1 of FIG. 7), the precipitation heat treatment increased the clad hardness to 73.1 HV. This indicates some SSSS was formed during cooling that was capable of precipitation hardening. However, the hardness was below the T6 temper value, leading to the conclusion that the cooling rate was below the UCCR. The HAZ is the region which experienced substantial heating (but not melting) and extends from 1 mm to 4 mm deep in Case 1 of FIG. 7. The thermal cycling in the HAZ is sufficient to dissolve the alloying elements during heating and form SSSS during cooling, as evidenced by the substantial response to precipitation heat treatment in Case 1 of FIG. 7. The substrate region, which extends 4 mm and deeper in Case 1 of FIG. 7, experiences thermal cycling that advances the precipitation sequence to an overaged state. Positions deeper in the substrate experience a lower maximum temperature and less hardness reduction due to overaging.

FIG. 7 shows the hardness improvement in Case 2 from the addition of the in-situ liquid nitrogen quenching in accordance with the methods and apparatus disclosed herein. The higher cooling rate caused by the quenching from the cryogenic nozzle increased the clad hardness by 15.7% (73.1 HV to 84.6 HV), in comparison to Case 1. The as-deposited HAZ also increased in hardness by 8 HV indicating the liquid nitrogen removed heat from the workpiece and reduced the hardness degradation in the HAZ region. Then, after precipitation heat treatment, the HAZ showed a 19.3% hardness improvement (87.1 HV to 103.9 HV) from the increased cooling rate, in comparison to Case 1. These results demonstrate the benefit of rapidly cool the cladding immediately after it has been deposited and melted with the liquid nitrogen quenching agent to produce a tempered clad deposit with a hardness near that of the T6 temper.

The Case 2 clad hardness of 84.6 HV was still slightly below the T6 temper hardness of 90 HV. This could be due to a variety of reasons including a sub-UCCR cooling rate or solute segregation to the dendrite arms during solidification. However, the high hardness of the HAZ inspired the implementation of a multi-layer clad to add enough material to bring the high hardness from the HAZ into the deposited material. The extra clad layers could then be removed through a machining process to yield the high HAZ hardness at the surface.

Figure 8:
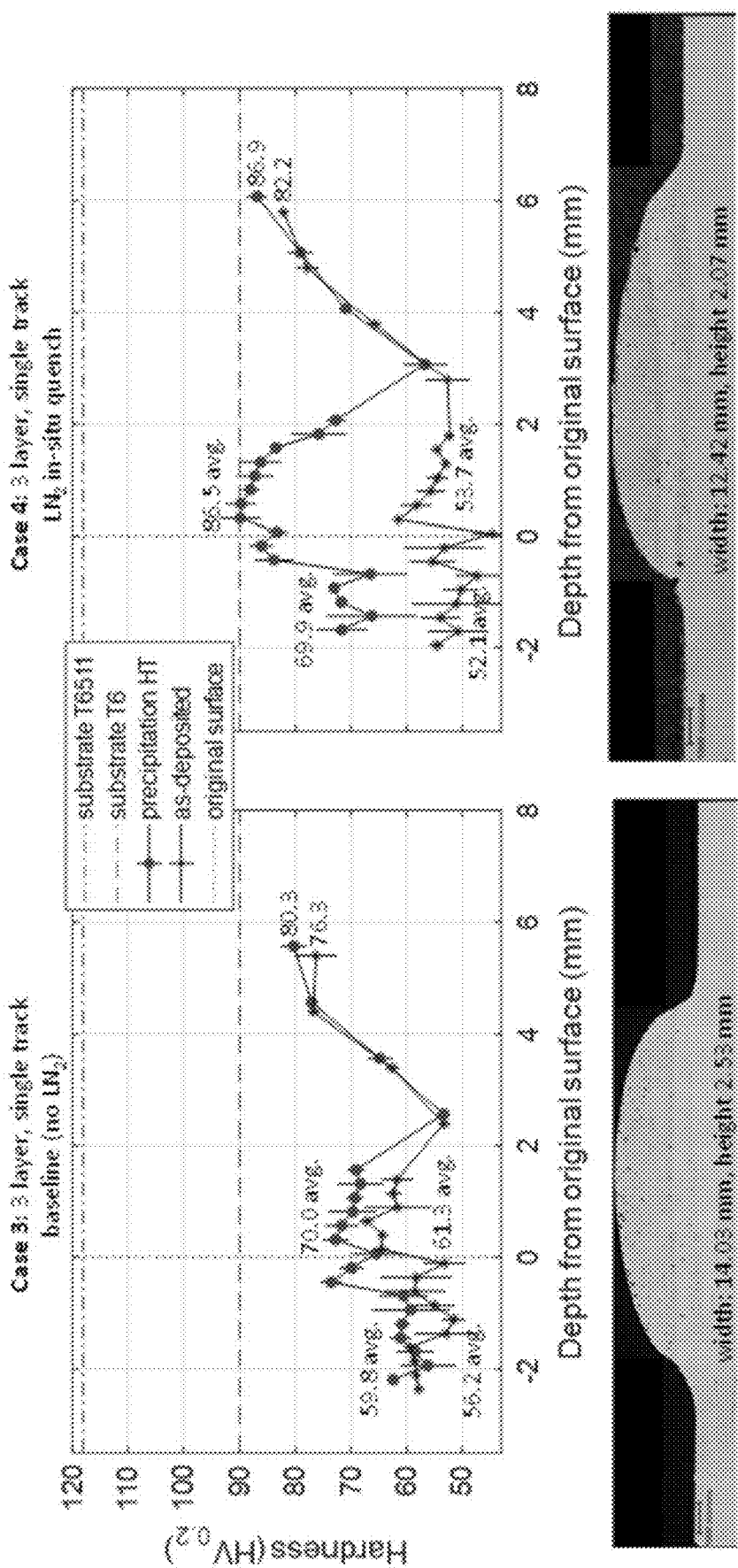
FIG. 8 shows results from three-layer single-track clads showing the hardness along the vertical centerline and clad images for Case 3 and Case 4 of FIG. 6. Image scale bars are 1 mm.

FIG. 8 shows the hardness characteristics in the as-deposited condition and after precipitation heat treatment for Cases 3 and 4. Case 4 of FIG. 8 reveals the three-layer single-track clad was successful in bringing the HAZ region above the original surface of the substrate. The liquid nitrogen quenching during the deposition of each layer in accordance with the methods and apparatus of the present disclosure provided substantial precipitation heat treated hardness improvement compared to Case 3 in FIG. 8. The hardness of the material just above the original surface in Case 4 is still slightly below the T6 temper line of 90 HV.

Inspection of the as-deposited clad and HAZ data shows the hardness is substantially lower in Case 4 of FIG. 8) compared to Case 2 of FIG. 7). This is attributed to a cooling rate during solidification and coarser microstructure due to the geometrical effects on the conductive heat transfer. In the final layers of Case 4, the clad cools by conducting heat downwards through the previous clad layers into the substrate. The cooling rate is therefore expected to be slower as more layers are added. The multi-track Case 5 improves the geometrical effects on the cooling rate by allowing the clad layer to transfer heat downwards into the substrate as well as transversely into the previous clad. An increase in the as-deposited hardness is expected.

Figure 9:
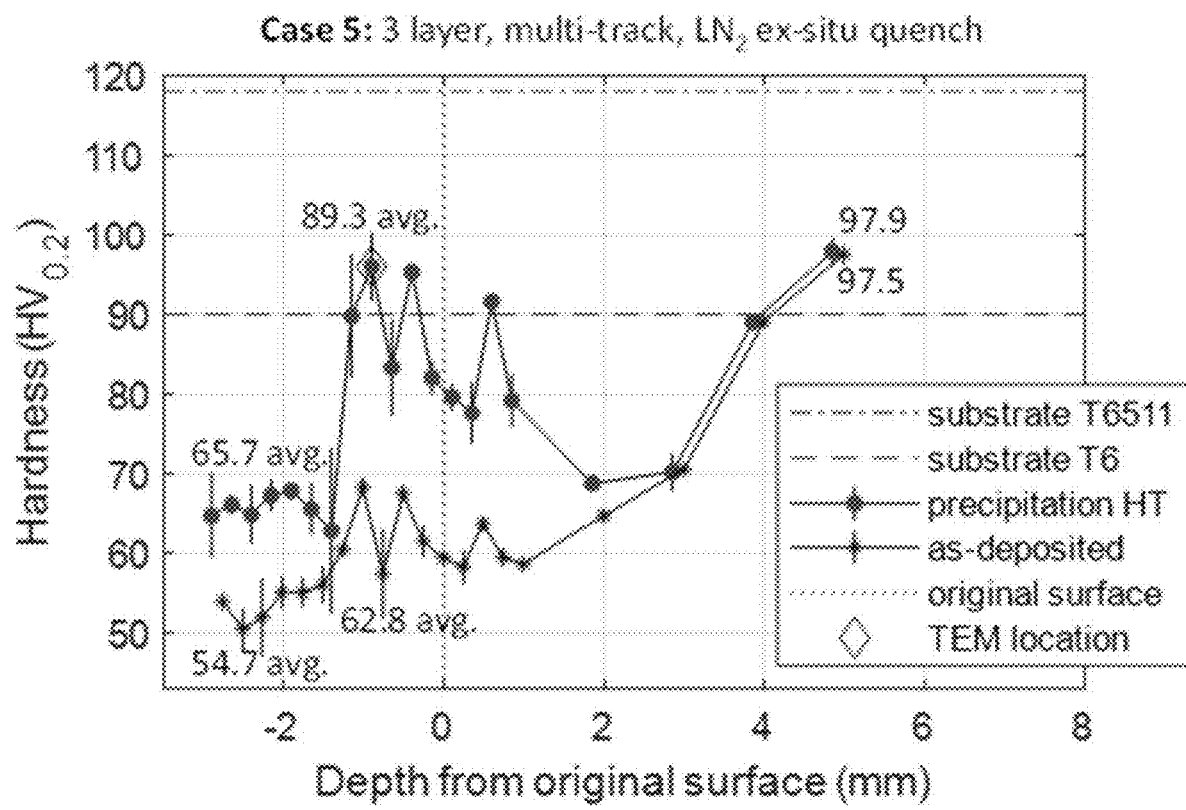
FIG. 9 shows hardness values along the vertical centerline for Case 5 of FIG. 6.

FIG. 9 shows the hardness characteristics in the as-deposited condition and after precipitation heat treatment for Case 5. The HAZ was brought above the original surface and the as-deposited hardness was improved to 62.8 HV. This shows the multi-track scheme was successful in increasing the as-deposited hardness by improving the geometrical effects on solidification compared to the three-layer single-track cases. Precipitation heat treatment then increased the HAZ hardness above the original surface to an average of 89.3 HV. This essentially is as hard as the 90 HV T6 temper with a few locations even above the T6 reference line. As such, the methods disclosed herein of laser cladding, liquid nitrogen quenching, and subsequent precipitation heat treatment is shown to be capable of creating clad deposits as hard as the T6 temper, without the need to subject the entire workpiece to solution heat treatment.

TEM analysis: The precipitate structures were investigated via Transmission electron microscopy (TEM) at the locations marked by blue diamonds in FIG. 7 and FIG. 9. The hardness associated with each micrograph is known as the lamellas were extracted adjacent to hardness indentations. Three samples from the deposited dads were analyzed including from Case 1 at a hardness of 73.9 HV, Case 2 at 84.8 HV, and Case 5 at 93.4 HV. The lamellas were extracted from a plane parallel to the irradiated surface of the substrate.

Figure 10:
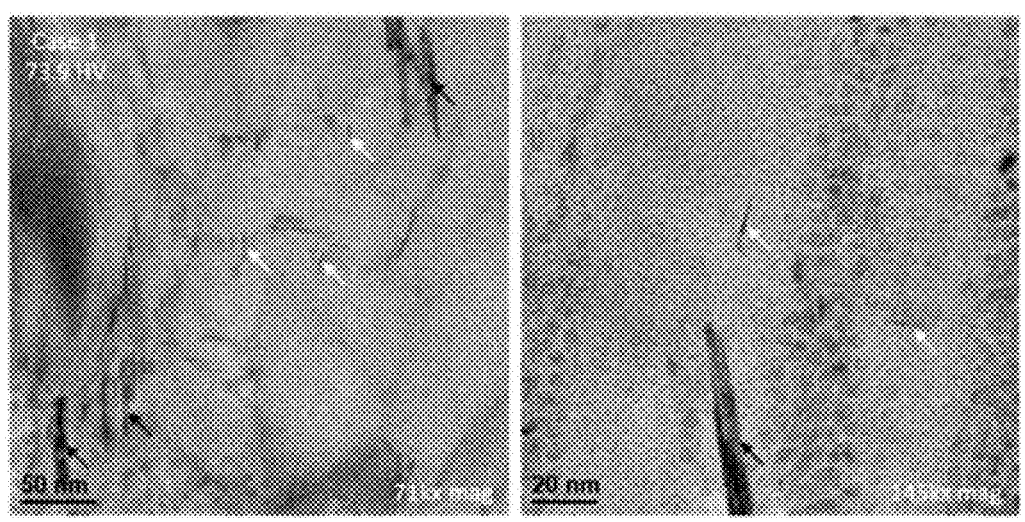
FIG. 10 shows bright-field TEM images from the deposited material in Case 1 (single-layer single-track baseline with no $LN_2$) of FIG. 6, representing a hardness of 73.9 HV, with black arrows identifying larger precipitates and white arrows identifying the fine precipitates.

FIG. 10 shows the TEM micrographs from the clad region of Case 1 where two types of precipitates were detected. The first is the larger precipitates of around 40 nm to 100 nm in length which are identified as $\beta'/B'$ and labeled with black arrows. These precipitates are associated with sub-UCCR cooling and are formed during quenching through 380° C. to 250° C. Alloying elements are consumed by these precipitates and result in a decreased concentration of SSSS following step (2) of the heat treatment process. Precipitation heat treatment then results in the formation of the finer precipitates labeled with white arrows which are identified as $\beta''$ of length~15 nm. The distribution of the fine precipitates is sparse which results in the fairly low hardness of 73.9 HV. Scaly surface features in the 145 kx micrograph are a consequence of the ion milling lamella preparation.

Figure 11:
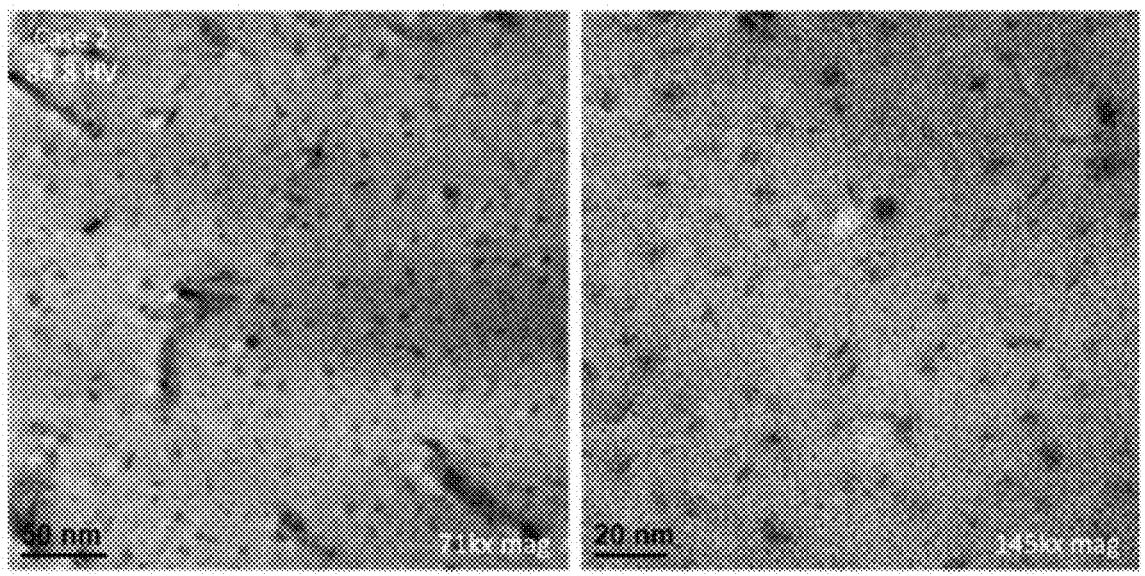
FIG. 11 shows bright-field TEM images from the deposited material in Case 2 (single-layer single-track with in-situ $LN_2$ quenching) of FIG. 6, representing a hardness of 84.8 HV.

FIG. 11 shows the TEM micrographs from the clad region of Case 2. In the 71 kx image, a few of the larger $\beta'/B'$ precipitates were still detected. In contrast to Case 1, however, the increased cooling rate from the liquid nitrogen quenching in Case 2 allowed for the formation of fine and densely packed $\beta''$ precipitates during the precipitation heat treatment. The hardness hence increased to 84.8 HV in comparison to the sparse precipitate distribution observed in the 73.9 HV clad of Case 1.

Figure 12:
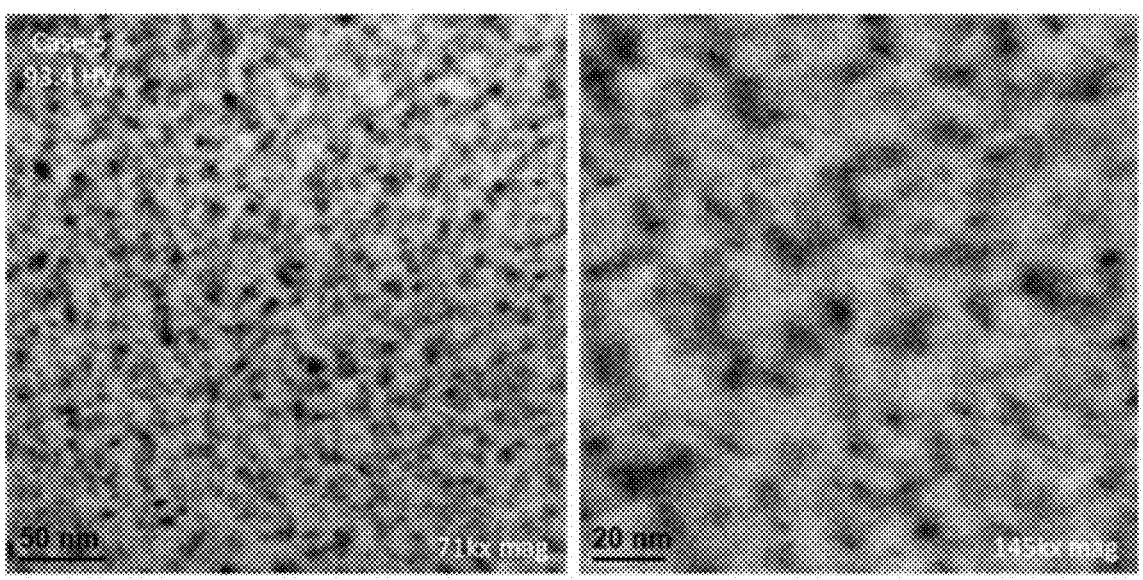
FIG. 12 shows bright-field TEM images from the deposited material in Case 5 (three-layer multi-track with ex-situ $LN_2$ quenching) of FIG. 6, representing a hardness of 93.4 HV.

FIG. 12 shows the TEM micrographs from the deposited material of Case 5. The increased cooling rate from the geometrical effects of the multi-track clad and the liquid nitrogen quenching suppressed more of the $\beta'/B'$ precipitation during cooling, which increased the concentration of SSSS. Precipitation heat treatment then formed a very dense precipitate distribution and increased the hardness to 93.4 HV. These precipitates are identified as $\beta''$ and are associated with the maximum hardness available from the precipitation strengthening mechanism and the T6 temper. Comparing Case 5 and 2 to Case 1, it is clear that the addition of liquid nitrogen quenching to the laser cladding process in accordance with the methods of the present disclosure can increase the density of the precipitate distribution (after precipitation heat treatment) and improve the hardness of the deposited material.

Figure 13:
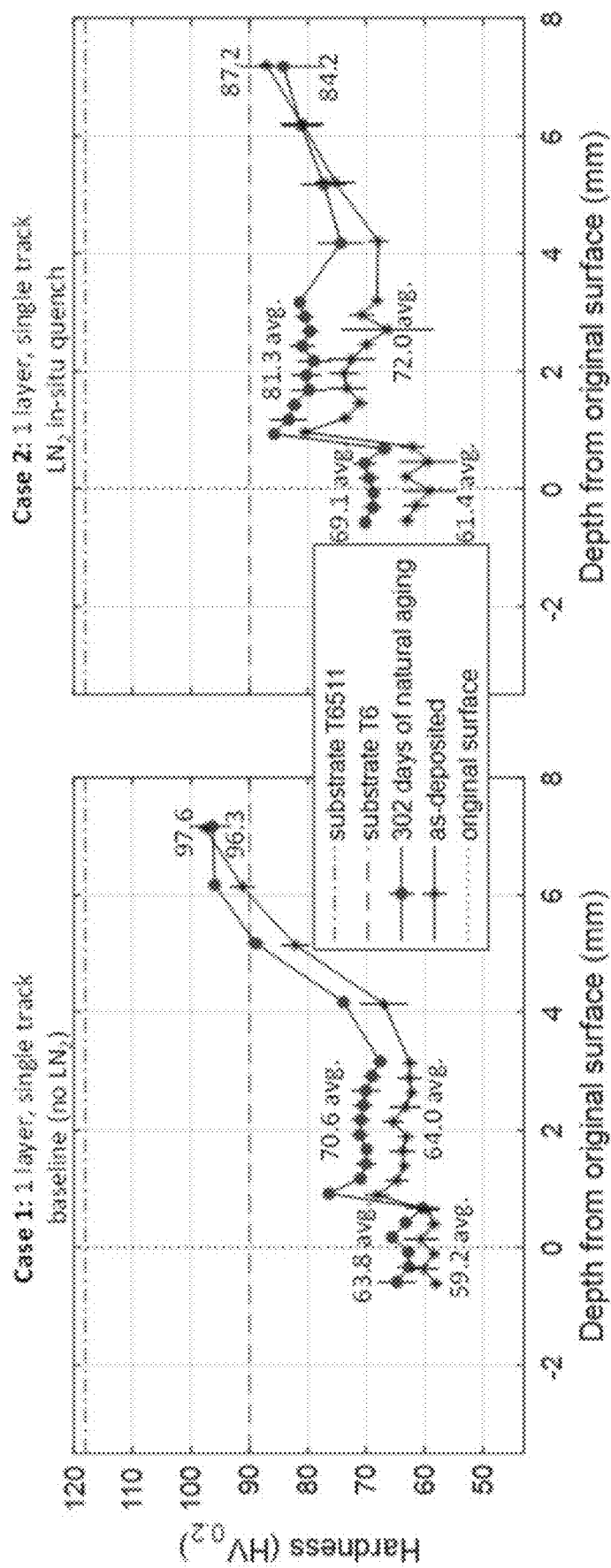
FIG. 13 shows results from single-track single-layer clads showing the hardness along the vertical centerline in the as-deposited (7 days of natural aging) and after 302 days of natural aging for Case 1 and Case 2 of FIG. 6.

Modifications: Some modifications to the present method for producing tempered clad deposits are possible and useful. For example, it may be desirable to improve the hardness of a workpiece surface without material deposition. The size of the workpiece may already be in the sought-after final dimensions, or it may be desirable to perform the material deposition and cryogenic quenching in separate operations, similar to Case 5. In this example, the laser power could be set carefully to avoid melting while still locally heating the material to the solution heat treatment temperature. Cryogenic quenching and precipitation heat treatment will then increase the surface hardness. Many of the defects associated with melting and solidification (porosity, solidification cracking, etc.) would be avoided and the high hardness of the HAZ may be brought to the surface without the need for post-machining. In another example, it may be desirable to skip the aging heat treatment in step (3) and allow a smaller degree of precipitation hardening via natural aging at room temperature. In this arrangement, the method then does not require a furnace in any way. FIG. 13 shows the hardness for Case 1 and 2 after 302 days of natural aging to demonstrate this modification. In comparison to the baseline, the liquid nitrogen quenching of the present disclosure improves the naturally aged clad and HAZ hardness by 8.3% and 15.2%, respectively.

It is clear from the above detailed description that a method to deposit quench-sensitive age-hardening aluminum alloy dads was described that produces a hardness similar to the T6 temper without the requirement of solution heat treatment. The method in the examples as tested included locally melting the workpiece and powder feedstock with a high-powered laser, quenching the deposited material with liquid nitrogen, and finally precipitation heat treatment. Aluminum alloy 6061 dads were deposited to demonstrate the hardness improvement from the liquid nitrogen quenching. In the case of single-layer single-track cladding, including the liquid nitrogen quenching improved the clad hardness by 15.7% in comparison to the naturally cooled baseline case. Combining the liquid nitrogen quenching with multi-track multi-layer cladding produced deposited material with hardness comparable to the T6 temper. The microstructure was investigated with TEM to show the densely packed precipitates that were produced through the increased cooling rate from the liquid nitrogen quenching and resulted in improved hardness.

The invention is also applicable to other materials that are also quench-sensitive and are amenable to age/precipitation-hardening, such as stainless steel 17-4 and Inconel 718. Further, the material on the surface could be deposited by any heat-added process, such as arc welding, electron beam melting, etc. It is to be noted that aluminum must have alloying elements for there to be age hardening. Therefore, in this disclosure, the term "aluminum clad" is used to mean "aluminum alloy clad," and these two phrases are used interchangeably in this disclosure.

The apparatus and methods of this disclosure can be used for any worn (abrasive wear, fatigue cracks, surface pitting from corrosion, etc.) part suitable to be repaired by laser cladding. Examples include, but are not limited to, torpedo shafts with surface corrosion that need to be repaired for proper sealing, shafts on construction equipment worn out by abrasive wear with dirt and sand, perhaps some large gear teeth with surface pitting, etc.

While the present disclosure has been described with reference to certain embodiments, it will be apparent to those of ordinary skill in the art that other embodiments and implementations are possible that are within the scope of the present disclosure without departing from the spirit and scope of the present disclosure. For example, the methods could include additional steps and/or have steps in different orders, the apparatus and their components could differ in appearance and construction from the embodiments described herein and shown in the drawings, functions of certain components of the apparatus could be performed by components of different construction but capable of a similar (though not necessarily equivalent) function, and various materials could be used in the fabrication of the apparatus and/or their components. It is therefore intended that the foregoing detailed description be regarded as illustrative rather than limiting. As such, and again as was previously noted, it should be understood that the invention is not necessarily limited to any particular embodiment described herein or illustrated in the drawings.

The invention claimed is:

1. A method of increasing surface hardness of a quench-sensitive age-hardening material without material deposition to improve the hardness of an existing surface of the quench-sensitive age-hardening material, the method comprising:

providing a workpiece made of quench-sensitive age hardening material;

providing a heat source for heating the workpiece and a cryogenic nozzle for delivery of a cryogenic quenching fluid;

without material deposition on an existing surface of the workpiece, scanning the existing surface of the workpiece with the heat source; and quenching the existing surface of the workpiece with a spray of the cryogenic quenching fluid from the cryogenic nozzle, wherein the spray of the cryogenic quenching fluid immediately follows the heat source and quenches the workpiece;

wherein the method results in a surface hardness of the existing surface that is higher than can be achieved without the spray of the cryogenic quenching fluid.

2. The method of claim 1, wherein the heat source is used to raise the local temperature of the existing surface of the workpiece to at least the solution heat treatment temperature or at least within 200° C. of the solidus temperature of the quench-sensitive age hardening material.

3. The method of claim 1, wherein the spray of the cryogenic quenching fluid has a flow rate in the range of 0.05 L/min to 10 L/min.

4. The method of claim 1, further comprising subjecting the workpiece to an aging heat treatment with an aging temperature in the range of 100° C.-275° C. for an aging time in the range of 1-48 hours.

5. The method of claim 1, wherein the workpiece is subjected to natural aging near room temperature following the spray of the cryogenic quenching fluid.

6. The method of claim 1, wherein the heat source comprises a laser beam.

7. The method of claim 1, wherein the heat source comprises at least one of an electrical heat source, an electron beam, a plasma, an arc, and a combustion flame.

8. The method of claim 1, wherein the workpiece material is at least one of an aluminum alloy selected from the Al—Cu group (2000 series), an aluminum alloy selected from the Al—Mg—Si group (6000 series), and an aluminum alloy selected from the Al—Zn—Mg group (7000 series).

* * * * *